United States Patent Office 3,639,424
Patented Feb. 1, 1972

3,639,424
EXTRUDABLE AND MOLDABLE PLASTIC COMPOSITIONS REINFORCED WITH HEAT SET POLYESTER FIBERS
Theodore F. Gray, Jr., James C. Weaver, and Robert L. Combs, Kingsport, Tenn., assignors to Eastman Kodak Company, Rochester, N.Y.
No Drawing. Filed Feb. 19, 1970, Ser. No. 12,854
Int. Cl. C08g 37/18, 37/34, 39/10, 45/14
U.S. Cl. 260—873        10 Claims

ABSTRACT OF THE DISCLOSURE

A molding composition including a polymer such as a polyolefin, and uniformly dispersed therein at least about 10% by weight of the composition staple length fiber having a denier of from about 1.5 to about 25, the fiber being of man-made polymers, such as poly(ethylene terephthalate) or poly(1,4-cyclohexylenedimethylene terephthalate). Uniform dispersion is achieved by heat setting fiber in the above denier range, preferably at constant length, and cutting it to staple length. The composition is produced by the steps of (a) heatsetting the fiber, (b) cutting the fiber to staple length, (c) fluffing the staple fibers to separate them, and (d) blending the fibers with a polymer.

---

This invention relates to extrudable and moldable compositions which will give extruded or molded products of high impact strength and other desirable physical properties and more particularly moldable polyolefins having uniformly dispersed therein a reinforcing material in the form of polyester staple length fibers having a denier of from about 1.5 to about 25 and which have been heat set, preferably at constant length and dispersed in the polyolefin material.

For a number of years it has been known to employ synthetic fibers of various types and also fabrics produced from such fibers in laminates of polymeric materials. Glass fibers in both filamentary and staple form dispersed in various thermoplastics such as nylon, polyolefins, and the like, and in various thermosetting materials, such as melamine formaldehyde, epoxy and polyester resins, have also been employed as a means of reinforcing such materials to provide compositions which can be molded. While for many applications glass fibers have proved to be satisfactory, and can be dispersed in polymeric materials, they have the disadvantage that, because of their inherent brittleness they tend to break up, both in molding operations and under the stresses encountered in use of the ultimate molded product.

Recently considerable research has been devoted to investigating the substitution of synthetic fibers for glass fibers as a reinforcing material for polymeric molding compositions designed for molding. However, it has been found that, unlike glass fibers, synthetic fibers do not disperse well in the polymer but tend to clump together in fiber aggregates with the result that non-uniformity of dispersion of the fibers occurs. When a composition in which the reinforcing fibers are non-uniformly dispersed is molded, non-uniform dispersion of fibers also occurs in the molded product. Recovered non-uniform fiber dispersion in the molded product will have lower impact strength and will display variations in physical properties which do not occur in molded products in which the reinforcing fibers are uniformly dispersed.

References to the use of synthetic fibers for polymer reinforcement are to be found in the literature as, for example, British Patent No. 873,353, an article by Isaksen, Newman, and Trementozzi, Polymer Engineering and Science, 94 (Apr. 1967) and Glen, British Plastics, 32, 273 (1959). However, no reference is made to any problems arising from the inability to obtain dispersion of the fibers in the polymeric material, nor to any recognition of special difficulties inherent in the use of such fibers. The only reference to treatment of the fiber material prior to dispersion in the polymer is that the fibers have been previously oriented.

Moreover, difficulties are found in many instances when synthetic fibers are blended with polymers. These difficulties are illustrated by blends of nylon fibers with polypropylene, where the fibers tend to disperse unevenly, bubbles form around the fibers, the fibers discolor, and the composition has reduced stability.

It is, therefore, an object of this invention to provide synthetic fibers which are uniformly dispersible in polymeric molding materials.

A further object of this invention is to provide a thermoplastic molding material having synthetic fibers uniformly dispersed therein, and a method for its manufacture.

Another object of this invention is to provide fibers of poly(ethylene terephthalate) and poly(1,4-cyclohexylenedimethylene terephthalate) which are heat set, preferably at constant length, have a denier of from about 1.5 to about 25 and are readily dispersible in a polymeric material.

Yet another object of this invention is to provide thermoplastic molding materials having synthetic fibers, such as fibers of poly(ethylene terephthalate) and fibers of poly(1,4-cyclohexylenedimethylene terephthalate) uniformly dispersed therein, and a method for its manufacture.

Yet a still further object of this invention is to provide thermoplastic molding materials having uniformly dispersed therein synthetic fibers such as those of poly(ethylene terephthalate) and poly(1,4-cyclohexylenedimethylene terephthalate) which fibers are heat set, preferably at constant lengths, and to provide a method for the manufacture of such molding materials.

These and other objects and advantages according to this invention will be more apparent upon reference to the following specification and appended claims.

According to the present invention, the prior disadvantages of the prior synthetic fibers used to reinforce polymeric molding materials are overcome by heat setting the synthetic fiber and cutting it into staple length. Preferably the heat setting is accomplished while the fiber is maintained at a constant length. When the molding material is a polyolefin and the fiber is a polyester, a heat setting temperature range of from about 145° C. to about 25° C. below the melting point of the material of the fiber produces satisfactory results. For poly(ethylene terephthalate) the preferred heat setting temperature is in the range of from about 170° C. to 230° C. For poly(1,4-cyclohexylenediamethylene terephthalate) preferred heat setting temperature is in the range of from about 190° C. to 260° C.

After being heat set and cut to staple length, the fiber may be fluffed or opened to produce fiber separating and then blended with a polymer to form a mixture of fiber and polymer. The polymer is preferably in a particulate form as, for example, powder. The separation step may be carried out during blending if tumble blending is used. Preferably, however, the opening or fluffing is carried out as a separate step.

The mixture of polymer and fiber is molded at a melt temperature which is at least 10° C. above the melting point of the polymer but is at least 25° C. below the melting point of the fiber material. It is preferred that the molding temperature be below the temperature used to heat set the fiber. A finished molded article may be produced directly from the powder-fiber mixture as it may be extruded into rods which are pelletized for use in subsequent extrusion or molding operations. The extruded or molded article may take any of the well known forms as, for example, sheets, plates, rods, tubes, films, and the like.

It is found that fibers heat set as described above can be more readily separated from one another and become more uniformly dispersed in the polymer both in the moldable blend and in the molded article. While the exact reason for this is not clearly understood, we believe it is the result of two factors. One factor is less fiber shrinkage after heat setting and thus less fiber ball-up which enhances separability. The second factor is increased fiber stiffness at any denier which enhances the dispersibility of the fibers in the polymer.

The poly(ethylene terephthalate) or poly(1,4-cyclohexylenedimethylene terephthalate) fibers which may be employed in accordance with our invention may be produced and heat set in accordance with procedures well known to those skilled in the art. For example, poly(ethylene terephthalate) fibers may be prepared in accordance with the procedure described in the patent to Whinfield and Dickson, U.S. Pat. No. 2,465,319. Poly(1,4-cyclohexylenedimethylene terephthalate) fibers may likewise be prepared in accordance with the procedure described in Kibler, Bell and Smith U.S. Pat. No. 2,901,466.

The heat setting of poly(ethylene terephthalate) and poly(1,4 - cyclohexylenedimethylene terephthalate) fibers is disclosed in the text entitled, Fibers from Synthetic Polymers, edited by Roland Hill and published by Elsevier Publishing Company, 1953 edition, page 442. Another disclosure of heat setting of poly(1,4-cyclohexylenedimethylene terephthalate) fibers is in the text entitled, Man-Made Fibers: Science and Technology, edited by Mark, Atlas and Cernia, published by Inter-science Publishers, 1968 edition, page 113. Fibers suitable for use in preparing the compositions according to our invention may range in denier from about 1.5 to about 25 and are preferably 15–25 denier. The fibers are preferably heat set at constant length of the fiber during heat setting, but alternatively may be heat set under conditions which permit free shrinkage of the heat set fiber.

In formulating the extrudable or moldable composition of our invention the polyester fiber content may range from about 5% to 50% by weight, based on the weight of the composition. Dispersion of the heat set polyester fiber in the polymer material may be accomplished by any known and acceptable dispersing method such as mechanical blending of particulate polymer with the fibers or, for example, by melt extrusion of the polymer in association with the fiber material and similar procedures known to those skilled in the art.

Special reference has been made above to the use of a polyolefin such as polyethylene or polypropylene as the polymer component of our compositions. Other thermoplastic or thermosetting polymers moldable at a temperature of at least 25° C. below the melting point of the polyester fiber component can be employed. Such less advantageous polymers which may be employed are polystyrene, copolymers of olefins in which the comonomer is less than 20 mole percent of an acrylate, methacrylate, vinyl monomers, epoxide resins, phenol-formaldehyde resins, melamine formaldehyde resins, polyesters, polyimides, and the like.

The preferred polyolefins are predominantly crystalline, e.g., polyethylene, polypropylene, copolymers of ethylene and propylene, copolymers of propylene and other monoolefins having 3 to 8 carbon atoms, etc. Such polyolefins generally have densities in the range of 0.85 to 1.0 (ASTM D1505), Vicat softening points greater than about 100° C. (ASTM D1525), and other properties associated with advantageous molding materials.

In employing the improved compositions of our invention the standard procedures of extrusion, injection and compression molding may be employed to produce extruded or molded products of improved impact strength and other desirable physical properties. The principles and practice of these operations are well known to those skilled in the art and thus need not be described in detail herein.

The following examples are included for a better understanding of the invention and set forth comparative data not included within the scope of the claims so as to illustrate advantages of the invenion.

EXAMPLE 1

Poly(ethylene terephthalate) fibers having a denier of 1.5 are prepared under the conditions shown in Table 1 below and cut into staple fiber lengths shown below. The fibers are allowed to shrink freely during heat setting.

TABLE 1

| Sample | Heat set temperature °C.) | Time (min.) | Staple length (inch) |
|---|---|---|---|
| a | Not heat set | 5 | ¼ |
| b | do | 5 | ½ |
| c | 145 | 5 | ¼ |
| d | 145 | 5 | ½ |
| e | 170 | 5 | ¼ |
| f | 170 | 5 | ½ |

Each sample is placed five grams at a time into a quart jar having a screen wire top and fluffed by blowing air into the jar for five minutes.

Those fibers heat set at 170° C. are found to separate readily when fluffed. The individual strands separate very easily with little clinging and the formation of only a few clumps of unseparated fibers. The fibers heat set at 145° C. also separate when fluffed; however, strand separation is not as complete as in the case of fibers heat set at 170° C. Those fibers not heat set are much more difficult to separate than either the fibers heat set at 170° C. or at 145° C. Many more of the nonheat set fibers cling together and result in a larger number of "clumps" of fibers.

In the following examples the percentages are by weight of the combined weight of fiber and polymer.

EXAMPLE 2

Each sample listed in Table 1 prepared as described in Example 1 is mixed in a jar with polypropylene powder. The mixtures (five grams fiber and forty-five grams powder, 10 weight percent fiber) are tumbled to blend the powder uniformly throughout the fiber mass. Molded plaques are formed from each mixture by placing them in a ⅛ in. x 4 in. x 5 in. mold on a flat bed press and compression molding at 210° C. for two minutes under a force of 12 tons on a 2 in. diameter ram. The molded plaques are quenched by circulating chilled water through the platens of the press for 20 minutes. The molded plaques are evaluated for degree of fiber separation, fiber dispersion, and fiber bundle formation. Visual observation of the plaques is made by several individuals and ranked as shown in the following Table 2. Highest rank is assigned to those plaques evaluated as having the best fiber separation and dispersion and least fiber bundle formation.

TABLE 2

Fiber treatment: Average overall ranking
  Heat set at 170° C. _____ 1
  Heat set at 145° C. _____ 2
  Not heat set _____ 3

EXAMPLE 3

Compression molded plaques prepared as described in Example 2 from the mixtures containing ¼″ staple fiber are tested for impact strength as follows: Five specimens are cut from each plaque and notched Izod impact strength tests are run according to the ASTM D256 procedure. Table 3 shows the effect of fiber treatment on the impact strength values.

TABLE 3

| Heat set condition (° C.) | Average notched Izod impact strength (ft. lb./in.) | Range (ft. lb./in.) |
| --- | --- | --- |
| 170 | 0.98 | 0.83 |
| 145 | 0.94 | 0.95 |
| Not heat set | 0.85 | 1.53 |

From Table 3 it can be seen that the average values of impact strength are substantially higher for the molded plaques of polypropylene containing heat set fibers than for the plaques of polypropylene containing unheat set fibers. Likewise, the range of the individual impact strength values is also broader for the molded plaques containing unheat set fibers than for those containing heat set fibers and the range is slightly broader for those containing fibers heat set at 145° C. than at 170° C. The broader range is an indication of poorer uniformity of fiber dispersion in the polypropylene of the unheat set fibers and the improvement that can be obtained by using heat set fibers, especially those heat set at 170° C.

EXAMPLE 4

Plaques (4 in. x 5 in. x ⅛ in.) composed of 90 weight percent of polypropylene and 10 weight percent of 1.5 denier, ½ in. staple length poly(ethylene terephthalate) fibers are compression molded as in Example 2. The poly(ethylene terephthalate) fibers in one set of plaques are heat set at constant length at 220° C. for 1-1.5 min. prior to cutting to staple length. In another set of plaques the poly(ethylene terephthalate) fibers are heat set at 145° C. for 5 min., not at constant length, but allowed free shrinkage. The plaques which contain fibers heat set at constant length at 220° C. show better dispersion and higher notched impact strength than the second set of plaques which contain fibers heat set at 145° C. with free shrinkage (1.98 ft. lb./in. compared to 1.1 ft. lb./in.). When unheat set fibers are used notched impact strength is only 0.91 ft. lb./in.

EXAMPLE 5

Poly(ethylene terephthalate) fiber, 1.5 denier ¼ in. long, heat set at 170° C. for 5 min., cut to staple length, fluffed, and blended with polypropylene powder (20 weight percent fiber) as described in Examples 1 and 2 are injection molded at 200° C. and 500 p.s.i. on a ram injection molding machine into tensile bars ⅛ in. thick, ½ in. wide and 6 in. long. As shown in Table 4, the notched Izod impact strength (ft. lb./in.) is found to be considerably higher for the heat set (170° C.) sample and the fiber dispersion is likewise better than in the sample reinforced with unheat set fibers.

TABLE 4

| Heat set condition: | Notched Izod impact strength (ft. lb./in.) |
| --- | --- |
| 170° C. | 1.02 |
| Unheat set | 0.40 |

The above examples illustrate the use of relatively low denier heat set polyester fibers as reinforcement material for polyolefin molding compositions. The examples which follow illustrate the use of somewhat higher denier heat set polyester fibers to obtain further improved properties in molded products produced from such compositions.

EXAMPLE 6

Samples of poly(ethylene terephthalate) fibers of 1.5, 6, 15 and 25 denier, heat set at constant length at 215° C. for 1-1.5 min. (except for a 1.5 denier, unheat set control) and cut into staple fibers ½ in. long are fluffed and then blended with polypropylene powder to form a mixture as in Examples 1 and 2 but containing 20 weight percent fibers. The mixture is extruded at 210° C. into ⅛ inch diameter rods which are then chopped into pellets ⅜ inch in length. These pellets are fed to a 6 oz. reciprocating screen injection molding machine and molded at a melt temperature of 210° C. into standard ASTM tensile bars. As a control, one standard bar is molded under these conditions but without any fibers. As with the compression molded plaques in Example 2 the standard bars prepared as just described are ranked. Highest rank as shown in Table 5 is assigned to those bars evaluated as having best fiber separation and dispersion and least fiber bundle formation. Fiber dispersion is a measure of uniformity of fiber separation. Fiber ball-up describes, for an individual fiber, whether it remains elongated in rod form or whether it curls up into a ball.

TABLE 5

| Fiber denier | Fiber ball-up | Fiber dispersion |
| --- | --- | --- |
| 25 | None | 1 |
| 15 | None | [1] 1 |
| 6 | Noticeable | 2 |
| 1.5 | Very noticeable | 3 |
| 1.5 (unheat set) | Considerable | 4 |

[1] Same as 25 denier.

The standard bars are tested for notched Izod impact strength (ASTM D256) and stiffness or flexural modulus (ASTM D790). The data shows that heat setting results in improved properties of molded products containing heat set fibers as compared to a molded product not containing fibers or containing non-heat set fibers. Also, the properties are enhanced, not only by heat setting but by the use of larger denier fibers. These improvements in impact strength and flexural modulus are evident from Table 6.

TABLE 6

| Fiber denier | Heat set temperature (° C.) | Notched Izod impact strength (ft. lb/in.) 23° C. | Notched Izod impact strength (ft. lb/in.) −40° C. | Flexural modulus (×$10^5$ p.s.i.) |
| --- | --- | --- | --- | --- |
| 25 | 215 | 1.68 | 1.79 | 2.47 |
| 15 | 215 | 1.65 | 1.19 | 2.50 |
| 6 | 215 | 1.25 | | 2.25 |
| 1.5 | 215 | 1.36 | | 2.20 |
| 1.5 | Unheat set | 0.72 | 0.68 | 2.13 |
| Control (no fiber) | | 0.41 | 0.17 | 1.99 |

EXAMPLE 7

Improvement in impact strength and flexural modulus by the prior heat setting is also obtainable with fibers of poly(1,4-cyclohexylenedimethylene terephthalate). Fibers of poly(1,4-cyclohexylenedimethylene terephthalate) having a denier of 15 are heat set at constant length at a temperature of 215° C. for about 1-1.5 min. and are then cut to a staple length of ¼ inch. These staple fibers are fluffed and blended with polypropylene as described in Examples 1 and 2 to form a mixture containing 10 weight percent fiber. This mixture is injection molded at a melt temperature of 210° C. to 220° C. as in Example 6. The dispersion of fibers is evaluated and is equivalent to or better than that found for the 15 denier poly(ethylene terephthalate) fiber of Example 6. Bars produced from this composition of polypropylene and poly(1,4-cyclohexylenedimethylene terephthalate) are found to have notched Izod impact strengths of 1.3-1.7 ft. lb./in. (ASTM D256) and a flexural modulus of 2.4-2.5×$10^5$ p.s.i. (ASTM D790).

EXAMPLE 8

Fibers heat set prior to cutting and dispersion besides giving improved fiber dispersion (which is further enhanced by the use of higher denier fibers) in compression and injection molded articles, are found also to give improved uniformity of dispersion in extruded sheets. Poly(1,4-cyclohexylenedimethylene terephthalate) fibers, 1.5 and 25 denier, unheat set and heat set at 215° C., and cut to a staple length of ¼ in., are mechanically blended with polyethylene powder to form a mixture containing 20 weight percent fibers. This mixture is extruded with a 1¼ in. diameter screw, 24:1 L/D extruder at a melt temperature of 210° C., into a sheet 3/32 in. thick x 6 in. wide. Examination of the sheets show the following order of fiber dispersion and increasing fiber ball-up:

TABLE 7

| Fiber Type | Ranking of Dispersion | Ranking of Ball-up |
|---|---|---|
| 25 denier/heat set | 1 (best dispersion) | 1 (least fiber ball-up). |
| 1.5 denier/heat set | 2 | 2. |
| 25 denier/unheat set | 3 | 3. |
| 1.5 denier/unheat set | 4 (poorest dispersion) | 4 (most fiber ball-up). |

It will be evident from the above description and examples of our invention that we have provided an improved extrudable or moldable composition especially useful in a wide variety of extrusion and injection and compression molding operations to produce a wide variety of extruded and molded products which will have high impact strength and other desirable physical properties. Furthermore, our invention has made a valuable contribution to the art in that it has extended the usefulness of poly(ethylene terephthalate) and poly(1,4-cyclohexylenedimethylene terephthalate) fibers as reinforcing materials for a wide range of thermoplastic and thermosetting polymers, particularly polyolefins such as polyethylene and polypropylene when used in extrudable or moldable compositions. As previously explained, this is attributable to the present discovery that, by heat setting the fibers, greatly improved dispersion in the polymer component is obtained with resulting improvement in physical properties of extruded and molded products produced from polymers so reinforced.

Although the invention has been described in considerable detail with reference to certain preferred embodiments thereof, it will be understood that variations and modifications can be effected without departing from the spirit and scope of the invention as described hereinabove.

What is claimed is:

1. A molding composition having high impact strength comprising:
   (A) a polymeric, thermoplastic moldable material;
   (B) about 5–50% by weight of said composition staple-length fibers having a denier of from about 1.5 to about 25, said fibers being of poly(ethyleneterephthalate) heat set in the range from about 145° C. to about 230° C. or poly(1,4-cyclohexylene-dimethylene terephthalate) heat set in the range of from about 190° C. to 260° C., uniformly dispersed in the polymeric material whereby articles molded from said composition have high impact strength and uniform physical properties;
   (C) said polymeric, moldable material having a molding temperature which is at least about 25° C. below the melting point of said staple length fibers.

2. A molding composition according to claim 1 wherein said fibers are present at a concentration greater than about 10% by weight of the composition.

3. A molding composition according to claim 1 wherein said moldable material is a predominantly crystalline polyolefin having 3 to 8 carbons, a density in the range of 0.85 to 1.0, and a Vicat softening point greater than about 100° C.

4. A molding composition according to claim 2 wherein said fibers are at least about 1/4 inch in length.

5. A molding composition having high impact strength comprising:
   (A) a moldable, predominantly crystalline polyolefin;
   (B) about 5–10% by weight of said composition staple length fibers having a denier of from about 1.5 to about 25, said fibers being of poly(ethylene-terephthalate) heat set in the range from about 145° C. to about 230° C. or poly(1,4-cyclohexylenedimethylene terephthalate) heat set in the range from about 190° C. to about 260° C., uniformly dispersed in the polyolefin whereby articles molded from said composition have a high impact strength and uniform physical properties;
   (C) said moldable, predominantly crystalline polyolefin having a molding temperature about 25° C. below the melting point of said fibers.

6. A molding composition according to claim 5 wherein the fibers have a denier in the range of from about 15 to 25.

7. A molding composition according to claim 5 wherein said fibers are at least about 1/4 inch in length.

8. A molding composition according to claim 7 wherein said moldable polyolefin has 3 to 8 carbon atoms, a density in the range of from about 0.85 to 1.0, and a Vicat softening point greater than about 100° C.

9. A method for manufacturing a molding composition having high impact strength and uniform physical properties comprising the steps of:
   (A) heat setting fibers of poly(ethylene-terephthalate) at a temperature in the range from about 145° C. to about 230° C. or poly(1,4-cyclohexylenedimethylene terephthalate) at a temperature in the range from about 190° C. to about 260° C., said fibers having a denier of from about 1.5 to about 25 whereby the separability and dispersibility of said fibers are enhanced;
   (B) cutting said fibers into staple length;
   (C) blending said fibers with a polymer until said fibers are uniformly dispersed therein forming a molding composition, said fibers being present in an amount of from about 5–50% by weight of said composition.

10. A method according to claim 9 wherein said fibers are blended into said polymer at a concentration of at least about 10% fiber based on the weight of the molding composition.

References Cited

UNITED STATES PATENTS

| 3,503,919 | 3/1970 | Cadus | 260—40 |
| 3,051,594 | 8/1962 | Aitken | 156—110 A |

FOREIGN PATENTS

| 634,179 | 1/1962 | Canada | 260—873 |

WILLIAM H. SHORT, Primary Examiner

E. WOODBERRY, Assistant Examiner

U.S. Cl. X.R.

161—237, 241; 260—835, 842, 850, 860